United States Patent
Wilkerson

(10) Patent No.: US 10,300,827 B2
(45) Date of Patent: May 28, 2019

(54) APPARATUS FOR DISPERSING EXPLOSION PREVENTION MIXTURE

(71) Applicant: A.L. Lee Corporation, Lester, WV (US)

(72) Inventor: Jason Wilkerson, Beckley, WV (US)

(*) Notice: Subject to any disclaimer, the term of this patent is extended or adjusted under 35 U.S.C. 154(b) by 327 days.

(21) Appl. No.: 15/083,129

(22) Filed: Mar. 28, 2016

(65) Prior Publication Data

US 2016/0281504 A1    Sep. 29, 2016

Related U.S. Application Data

(60) Provisional application No. 62/138,801, filed on Mar. 26, 2015.

(51) Int. Cl.
*B60P 1/00* (2006.01)
*E02F 3/96* (2006.01)
*E21F 5/10* (2006.01)

(52) U.S. Cl.
CPC ............ *B60P 1/006* (2013.01); *E02F 3/962* (2013.01); *E21F 5/10* (2013.01)

(58) Field of Classification Search
CPC .... A62C 2/04; A62C 3/02; A62C 3/04; A62C 3/06; B60P 1/006; B05B 13/005; E02F 3/962; E02F 3/6436; E21F 5/02; E21F 5/04; E21F 5/10; E21F 5/08
USPC .... 169/64, 46; 239/654, 661, 662, 663, 664, 239/670, 689
See application file for complete search history.

(56) References Cited

U.S. PATENT DOCUMENTS

| | | | | |
|---|---|---|---|---|
| 3,871,588 A | * | 3/1975 | Long | B60P 1/42 239/659 |
| 4,394,975 A | | 7/1983 | Bare, Jr. et al. | |
| 4,673,131 A | | 6/1987 | Travis | |
| 7,854,402 B1 | * | 12/2010 | Travis | E02F 3/6436 239/661 |
| 8,333,543 B1 | * | 12/2012 | Simmons | B60P 1/006 414/416.04 |
| 8,584,974 B2 | | 11/2013 | Masloff et al. | |
| 9,163,503 B1 | * | 10/2015 | Travis | E21F 5/10 |

(Continued)

OTHER PUBLICATIONS http://alleecorp.com/wp-content/uploads/2016/03/MARK-II-RAM-DUSTER.pdf Downloadable pdf, placed on A.L. Lee Corporation web site around May 2013.

*Primary Examiner* — Chee-Chong Lee
*Assistant Examiner* — Cody J Lieuwen
(74) *Attorney, Agent, or Firm* — Brian W. Foxworthy; Robert R. Waters; Waters Law Group, PLLC

(57) ABSTRACT

An apparatus for dispersing liquid flame retardant mixtures mounts in the bucket of mine scoop. The apparatus has a housing which is generally sized to fit within a mine scoop bucket while leaving space in the bucket for moving mine material. The housing has a reservoir within it for holding a fire prevention mixture. The mixture is a liquid mixture and the apparatus has a motor, pump, tubes, and nozzles for dispersing the fire prevention mixture. The apparatus accommodates a hydraulic cylinder for moving the mixture dispersing apparatus back and forth within the scoop bucket. Some embodiments of the apparatus have a front face with scraper blade elements that operate as a scraper blade similar to scraper blades in scoop buckets that do not have the apparatus in place.

3 Claims, 6 Drawing Sheets

(56) References Cited

U.S. PATENT DOCUMENTS

| | | | | |
|---|---|---|---|---|
| 2012/0256020 A1* | 10/2012 | Masloff | .................... | E21F 5/10 239/654 |
| 2013/0266408 A1* | 10/2013 | Zutaut | ....................... | E21F 5/10 414/352 |
| 2015/0114671 A1* | 4/2015 | VanBuren | ................. | E21F 5/10 169/45 |

* cited by examiner

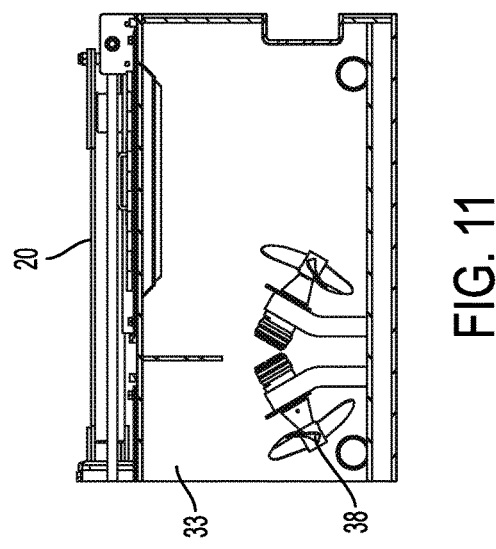
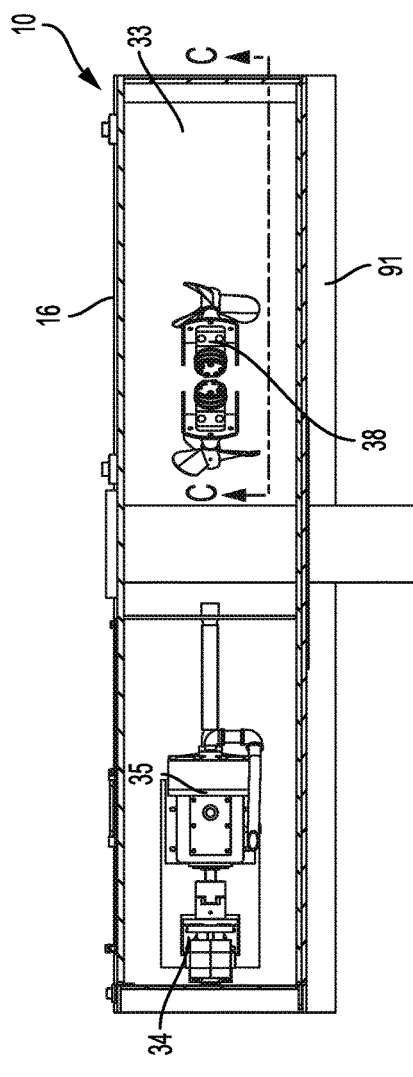
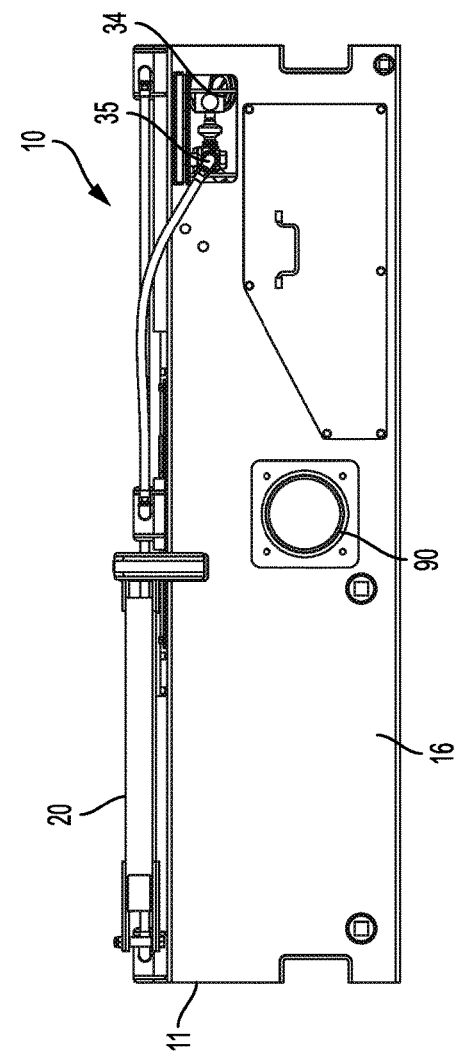

APPARATUS FOR DISPERSING EXPLOSION PREVENTION MIXTURE

This application claims priority to U.S. Provisional Application 62/138,801 filed on Mar. 26, 2015. The entirety of U.S. Provisional Application 62/138,801 including both the figures and specification are incorporated herein by reference.

FIELD OF THE INVENTION

This invention relates generally to prevention of explosions and fire in underground passages such as mines. More specifically, this invention relates to an apparatus that fits into a material scoop and disperses an explosion prevention mixture.

BACKGROUND OF THE INVENTION

An excess of airborne flammable dust or deposited flammable dust in closed spaces can pose an explosion hazard. This is the case for some underground mining operations, and especially so for underground coal mining. As coal is extracted from its surroundings, the process inevitably produces coal dust. The coal dust deposits onto surfaces of the mine and collects, and the deposited coal dust creates a highly flammable and explosive situation. If a spark from equipment, or other ignition source, is introduced to a deposit of coal dust, a fire or explosion may be ignited.

One of the techniques for preventing explosions in mines is dispersing a mixture of inflammable rock dust or a mixture of water and inflammable rock dust. The rock dust mixture coats the ceilings, floors, and pillars in the mine, creating a sealing layer of inflammable material over the highly flammable coal dust which is deposited there. This is an established technique which is required and regulated by safety regulations. Special attention is paid to surface areas near a coal face currently being worked. Typically, equipment dedicated to dispersing the flame prevention mixture is used. This requires moving additional equipment into the work area and may even require moving mining equipment out of the way to make room for the dispersing equipment in tight spaces.

RELATED ART

A. L. Lee of Lester, W.Va. makes and sells dry rock dusters such as the Mark II Ram Duster. The dry rock dusters by A. L. Lee are carried in material scoops and are movable within the material scoops by a hydraulic rod and cylinder. A blade on the front of the rock duster allow the material scoops to still carry material. The blade ejects material from the scoop. The dry rock dusters spread the rock dust with powered flingers and augers feed rock dust to the flingers. With the flingers and augers, the dry rock dusters use mechanical elements in an inherently abrasive environment. Also, dry rock dust systems can be sensitive to environmental moisture due to clumping and caking.

U.S. Published Patent Application 2013/0266408 A1 by Zutaut is for "ON BOARD ROCK DUSTER SCOOP BUCKET". In Zutaut, a scoop bucket for mining is adapted for dispensing rock dust. The scoop bucket includes a body with a first end and second end. The first end has an edge for scooping mined material therein and the second end has a wall for containing the scooped mined material. The second end also has a compartment for containing a rock duster system therein. The rock duster system includes a tank containing rock dust material and a blower for dispersing the rock dust material from the tank through a dispenser hose that extends from the compartment. Mine regulations, require that an operator be at the operator's station of the scoop when the vehicle is in use. This means that the apparatus of Zutaut inherently requires two persons to use the dust dispersing aspect of the apparatus.

U.S. Pat. No. 8,584,974 by Masloff, et al. is for "ROCK DUSTING APPARATUS". Masloff discloses a rock dusting apparatus comprising: a housing; a tank mounted within the housing which comprises a removable top wall member, a sidewall member and a bottom wall member configured to form an internal tank compartment for holding and mixing a rock dust composition; a mixer positioned on the bottom wall member for mixing the rock dust composition; a tank discharge port positioned on the bottom wall member or a lower portion of the sidewall member through which the rock dust composition can be discharged from the tank; a conduit extending from the tank discharge port to a housing discharge port; the conduit comprising a pump for transporting the rock dust composition through the conduit and through a discharge line operatively connected to the housing discharge port; and one or more motors mounted within the housing for powering the mixer and the pump. The apparatus is used for spraying rock dust compositions for suppressing propagation of a flame and/or fire caused by ignition of coal dust and/or gas within a coal mine. The apparatus of Masloff slides into a scoop and while the apparatus is in place, that scoop must be dedicated to dispersing the rock dust compositions.

U.S. Pat. No. 4,673,131 by Travis is for a "MINE DUSTING APPARATUS". In Travis, a mine dusting machine comprises a specialized hopper or scoop bucket having a floor, sides and ends and adapted for carrying substantially free-flowing particulate material. The apparatus has a powered ram on the hopper for pushing the material therein toward the front end thereof. A powered conveyor is mounted within the hopper adjacent the front end for transporting the material toward opposite sides of the hopper. Separate flingers are mounted on the front end at least adjacent each of the sides and adapted to receive the material transported thereto by the conveyor. Each of the flingers have at least one rotatable blade for dispersing the material with considerable force in a generally arcuate pattern. As with Masloff, once the apparatus of Travis is installed on the scoop, the scoop is dedicated to dispersing the particulate material and cannot be used to scoop material while the apparatus is in place.

There remains a need for an apparatus that provides the versatility of a liquid dispersal system and allows the dispersal of liquid flame retardant material from a scoop while maintaining the scoop function and allowing the operator of the scoop to disperse the material from the operator station.

SUMMARY OF THE INVENTION

Embodiments of the present invention for dispersing a dust control mixture in a mine has a housing. The housing is generally sized to fit within a mine scoop bucket while leaving space in the bucket for moving mine material. The housing has a reservoir within it for holding a liquid fire prevention mixture, and the apparatus has a motor, pump, tubes, and nozzles for dispersing the fire prevention mixture. The apparatus accommodates a hydraulic cylinder for moving the mixture dispersing apparatus back and forth within the scoop bucket. Some embodiments of the apparatus have a front face with scraper blade elements that operate as a scraper blade similar to scraper blades in scoop buckets that do not have the apparatus in place.

BRIEF DESCRIPTIONS OF THE DRAWINGS

FIG. 9 is a section view of the embodiment of the mixture disperser of FIGS. 1 and 2 along the section line A-A in FIG. 6.

FIG. 10 is a back view of the embodiment of the mixture disperser of FIGS. 1 and 2.

FIG. 11 is a section view of the embodiment of the mixture disperser of FIGS. 1 and 2 along the section line C-C in FIG. 9.

DETAILED DESCRIPTIONS OF THE EMBODIMENTS

Figure 1:
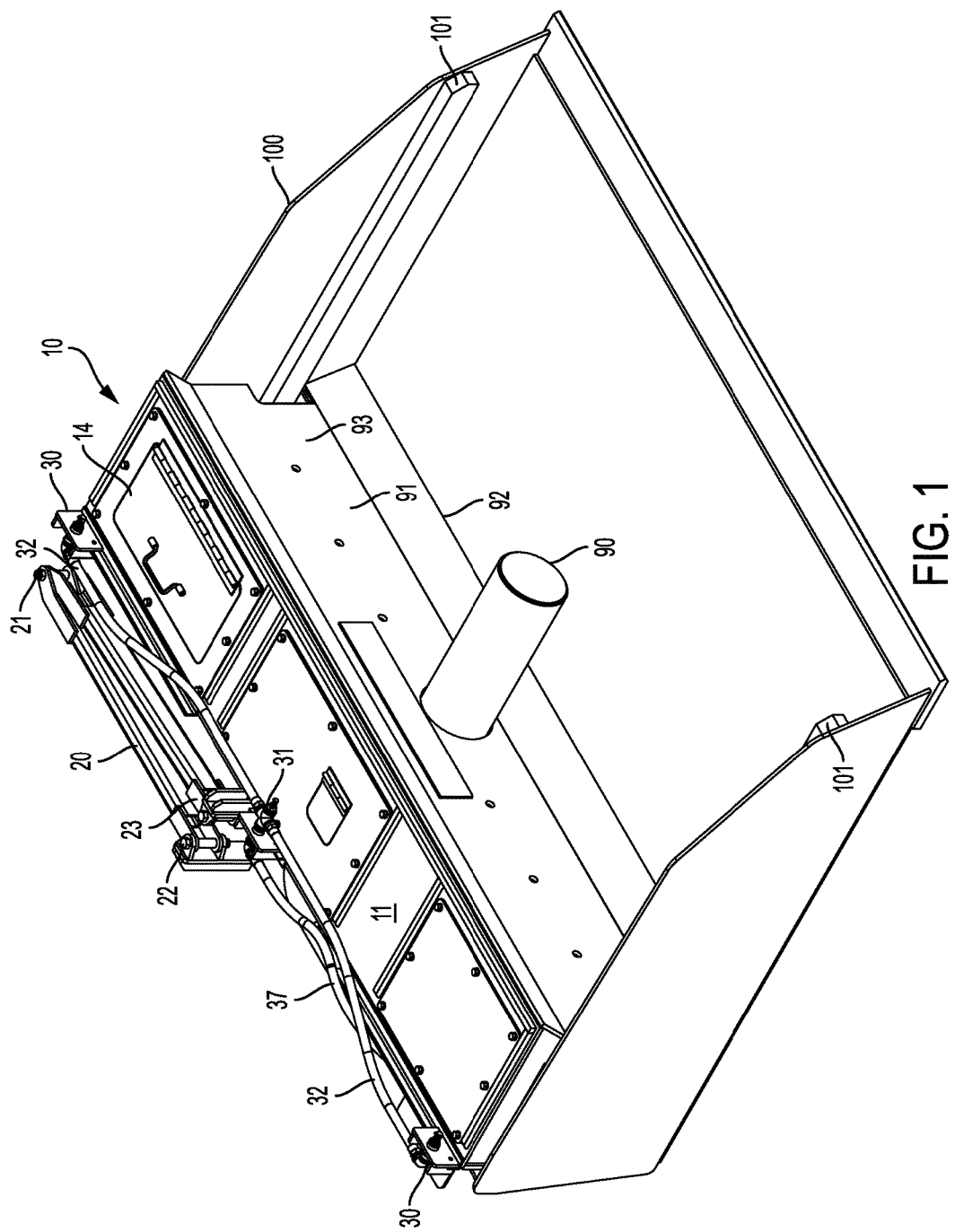
FIG. 1 is a left front perspective view of an embodiment of the mixture disperser of the present application, positioned at the back of the scoop bucket.

FIG. 1 is a left front perspective view of an embodiment of the mixture disperser 10 of the present application, positioned at the back of a scoop bucket 100. Bucket 100 is carried on a scoop vehicle (not shown). Mixture disperser 10 comprises housing 11, which is generally sized to fit within bucket 100, and carries the other components of mixture disperser 10. The width of housing 11 approximately matches the interior width of bucket 100. The length of housing 11 is a fraction of the length of bucket 100. This leaves a volume within bucket 100 for use in its usual capacity as a scoop for scooping and carrying mined material, such as coal, or for otherwise carrying material.

In preexisting scoop buckets, bucket 100 has an ejection blade located at the back of its interior. This blade is mounted to a hydraulic cylinder. When bucket 100 is full of mined material, the hydraulic cylinder is extended to move the ejection blade forward in bucket 100 to push the mined material out of bucket 100, emptying the mined material from bucket 100.

Figure 2:
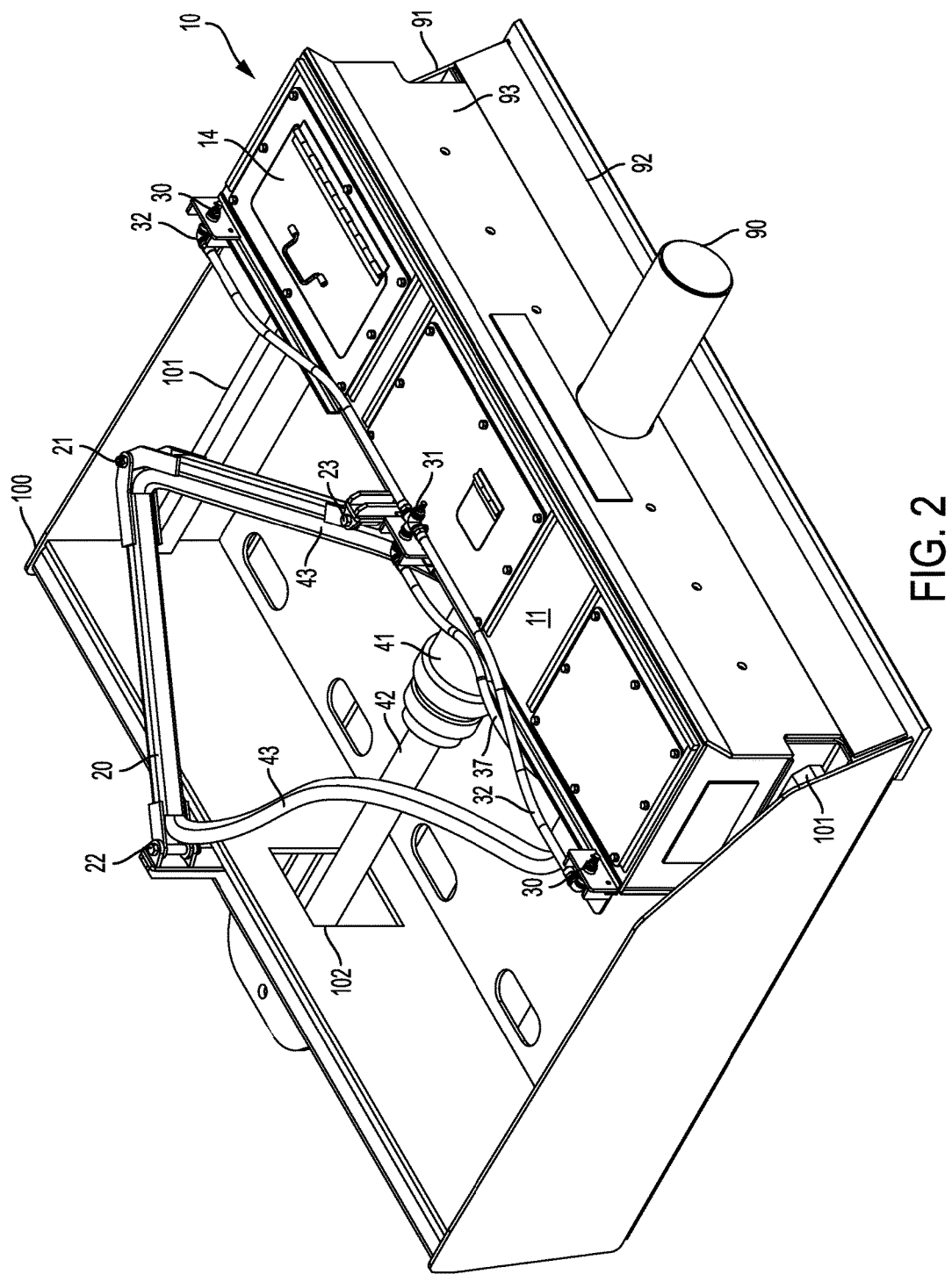
FIG. 2 is a left front perspective view of an embodiment of the mixture disperser of the present application, positioned at the front of a scoop bucket.

FIG. 2 is a left front perspective view of an embodiment of mixture disperser 10 of the present application, positioned at the front of a scoop bucket 100. Embodiments of the present invention maintain the ability of bucket 100 to scoop, carry, and discharge mined material while also adding the functionality of dispersing a fire suppressant liquid mixture. With mixture disperser 10 at the front of scoop bucket 100 in FIG. 2, hydraulic cylinder 41 and cylinder rod 42 are visible extending from mixture disperser 10 to the back of bucket 100 where they are connected to bucket 100. Hydraulic lines 43 carry the hydraulic fluid that extends and retracts cylinder 41, which moves mixture disperser 10 back and forth in bucket 100. Moving mixture disperser 10 back and forth positions mixture disperser 10 for dispersing the fluid mixture where desired.

Figure 3:
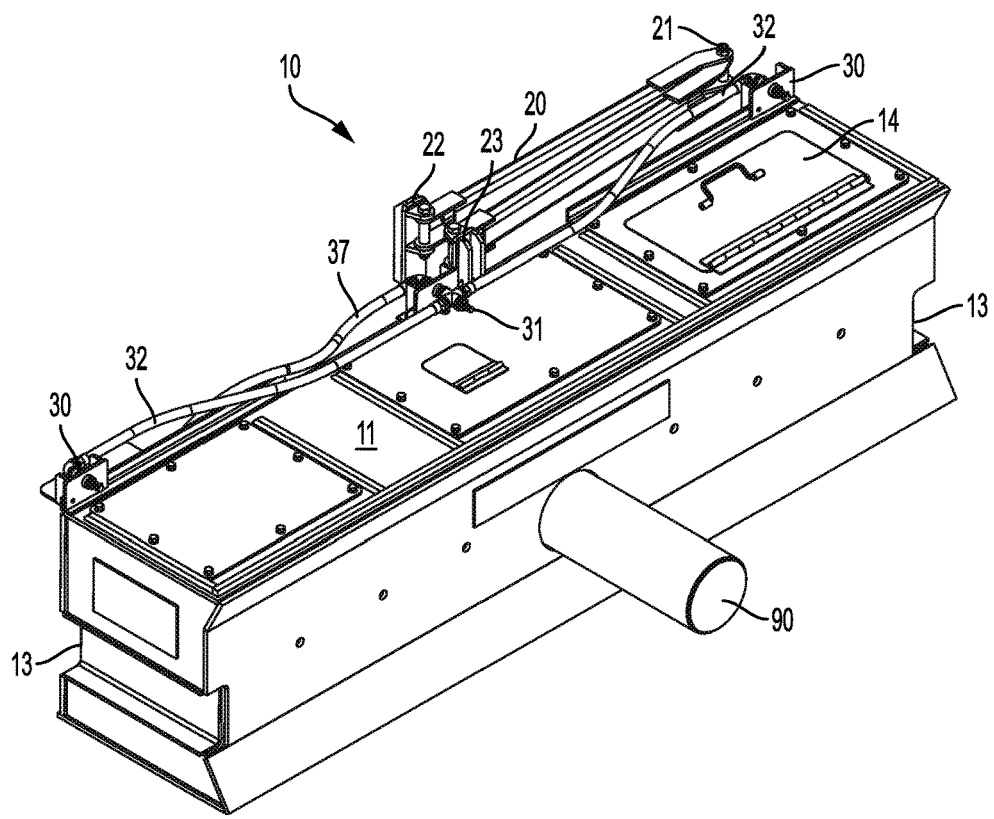
FIG. 3 is a left front perspective view of the embodiment of the mixture disperser of FIGS. 1 and 2, by itself.
Figure 4:
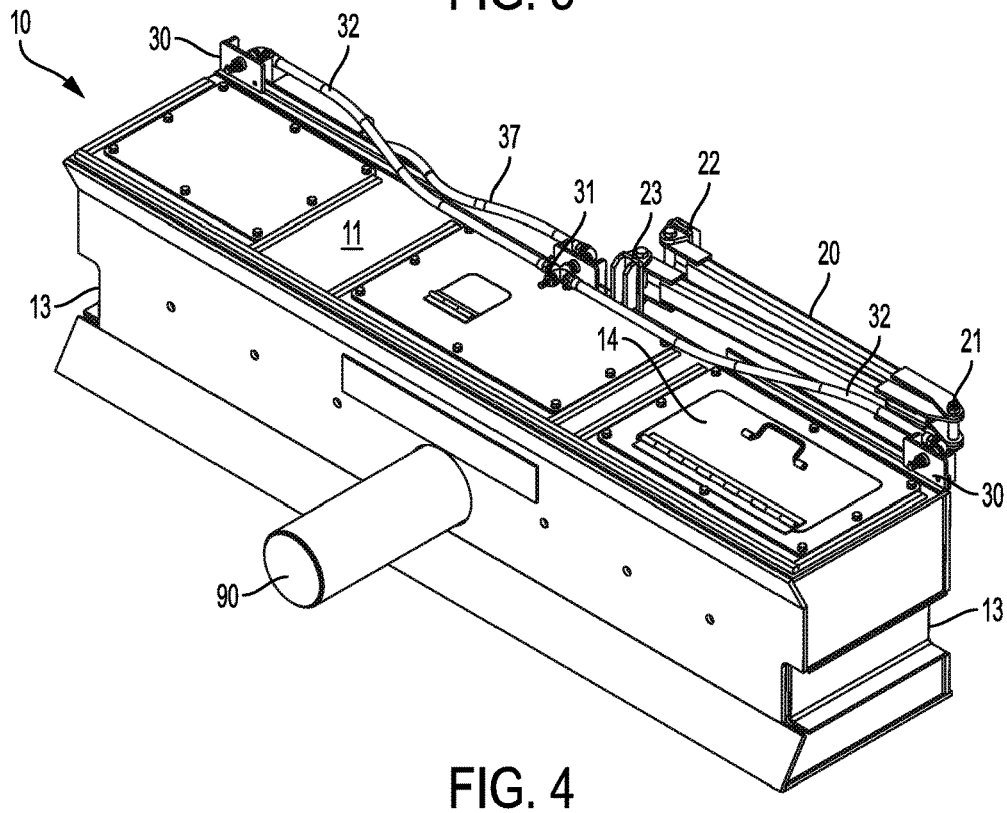
FIG. 4 is a right front perspective view of the embodiment of the mixture disperser of FIGS. 1 and 2, by itself.
Figure 5:
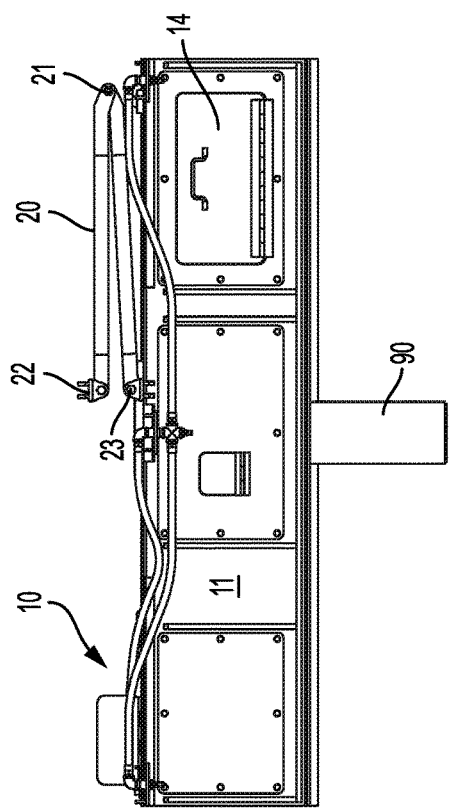
FIG. 5 is a top view of the embodiment of the mixture disperser of FIGS. 1 and 2.
Figure 8:
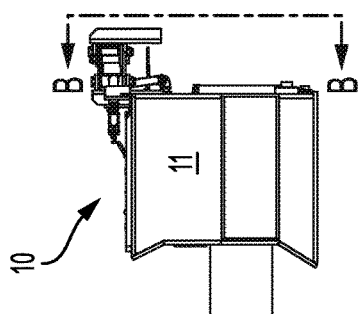
FIG. 8 is a right side view of the embodiment of the mixture disperser of FIGS. 1 and 2.
Figure 7:
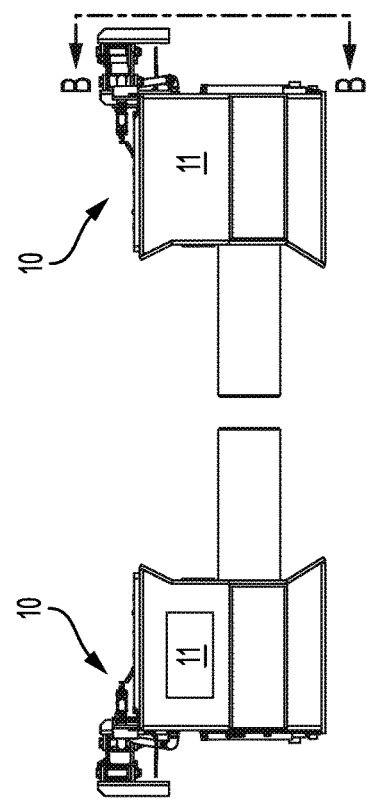
FIG. 7 is a left side view of the embodiment of the mixture disperser of FIGS. 1 and 2.
Figure 6:
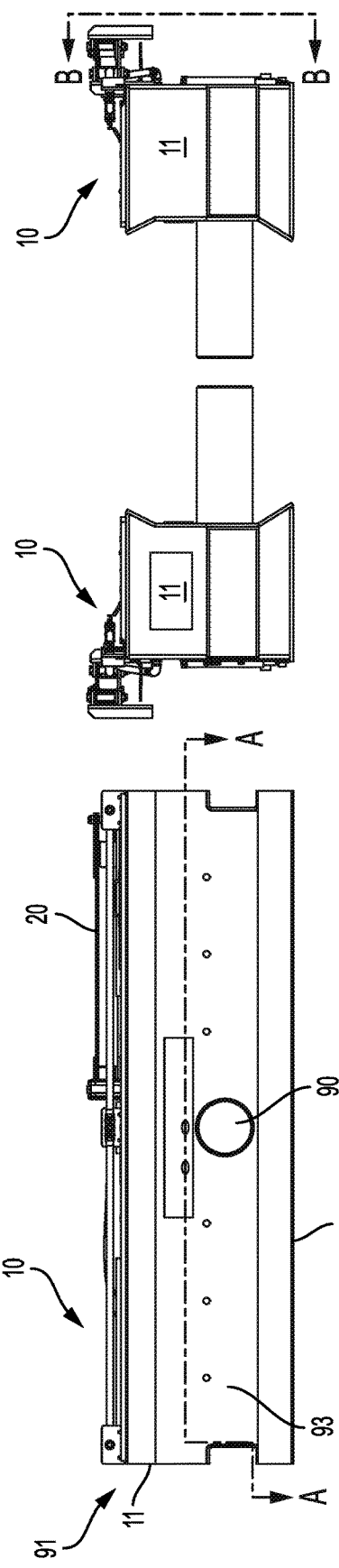
FIG. 6 is a front view of the embodiment of the mixture disperser of FIGS. 1 and 2.

In some embodiments of mixture disperser 10, front face 91 of mixture disperser 10 is configured like an ejection blade for optimal material moving function while protecting and preserving mixture disperser 10. Front face 91 may be comprised of a scraper edge 92 and face plate 93. Scraper edge 92 scrapes along bottom surface 101 of bucket 100. Face plate 93 presents a more robust surface to the mined material and protects the rest of mixture disperser 10. FIG. 3 is a left front perspective view of the embodiment of mixture disperser 10 of FIGS. 1 and 2, by itself, while FIG. 4 is a right front perspective view of the embodiment of mixture disperser 10 of FIGS. 1 and 2, by itself. In FIGS. 3 and 4, sides 12 of mixture disperser 10 are clearly visible. Sides 12 have notches 13 which are sized and located to fit over rails 101 in scoop bucket 100 which are visible in FIGS. 1 and 2. Notches 13 and rails 101 keep mixture disperser 10 in bucket scoop 100 when the considerable forces needed to eject mine material from bucket 100 are generated by the hydraulic ram.

In the embodiments shown in the figures, mixture disperser 10 disperses a liquid mixture which may include a slurry of flame retardant material, such as rock dust, mixed with water. Edge nozzles 30 are located at the top rear corners and center nozzle 31 is at the top rear center of mixture disperser 10. Primary tube 37 carries the mixture to center nozzle 31 and secondary tubes 32. Secondary tubes 32 run from primary tube 37 to edge nozzles 30 and supply the liquid mixture to edge nozzles 30. Edge nozzles 30, center nozzle 31, primary tube 37, and secondary tubes 32 are visible in FIGS. 1-6. The system may have as many nozzles as desired and the nozzles may be located to achieve the coverage desired for a given application for the system. Door 14 in top 15 of mixture disperser 10 gives access to reservoir 33 in mixture disperser 10, which allows reservoir 33 to be replenished with the mixture.

FIGS. 9-11 provide views of internal components of mixture disperser 10. FIG. 9 is a section view of the embodiment of mixture disperser 10 of FIGS. 1 and 2 along the section line A-A in FIG. 6. This view is from above the section. To the left in FIG. 9, motor 34 drives pump 35 which has an intake 36 in communication with reservoir 33 to the right.

FIG. 10 is a back view of the embodiment of mixture disperser 10 of FIGS. 1 and 2. Being a back view, FIG. 10 is reversed from FIG. 9, so motor 34 and pump 35 are located to the right and visible through a cutout panel in FIG. 10. Primary tube 37 runs from pump 35 to center nozzle 31 and secondary tubes 32. Secondary tubes 32 carry the mixture on to edge nozzles 30. The number and locations of nozzles can vary and may even be changed at the work site in some embodiments. Additionally, a plurality of pumps may also be employed. For example, with multiple pumps, different pumps could supply different sets of nozzles and be controlled separately for different patterns of dispersion.

To the right in FIG. 9 are located two mixers, or agitators, 38. Mixers 38 keep the fluid mixture in reservoir 33 moving and stirred up to prevent the non-liquid portion of the mixture from settling out. FIG. 11 is a section view of the embodiment of mixture disperser 10 of FIGS. 1 and 2 along the section line C-C in FIG. 9. In FIG. 11, it can be seen that mixers 38 are directed at the bottom of reservoir 33. If the mixture disperser 10 has been out of use long enough for significant settling to occur, mixers 38 can dislodge settle material from the bottom of reservoir 33 and return the material to suspension in the liquid.

Motor 34 and mixers 38 require power and controls. This is typically provided by the vehicle carrying the scoop bucket 100 and requires a power cord, or cable, to run from the vehicle power source to mixture disperser 10. Returning to FIG. 2, control support arm 20 spans between bucket 100 and housing 11. Control support arm 20 has hinge 21 approximately half away along it length and is pivotally connected at bucket end 22 to bucket 100 and at housing end 23 to housing 11. Power and control cables running from the vehicle to housing 11 are routed through control support arm 20. As housing 11 is moved back and forth, control support arm 20 extends and retracts while supporting the power and control cables and controlling their movements. This prevents, for example, a power cord from falling behind housing 11 as it is moved back to the rear of bucket 100. In addition to FIG. 2, control support arm 20 is visible in FIGS. 1, 3-8, 10, and 12.

The section view of FIG. 9 shows cylinder 90 passes through housing 11 of mixture disperser 10 and terminates at back panel 16 of housing 11. Cylinder 90 houses a hydraulic cylinder 41 which moves mixture disperser 10 back and forth. Returning to FIG. 2, cylinder 90 aligns with hydraulic cylinder 41 and rod 42.

When in use, mixture disperser 10 is mounted in a scoop bucket 100 and can be moved back and forth to allow the scoop bucket to be used as it normally is with only a fractional diminishment of load capability. To disperse the mixture, mixture disperser 10 may be extended out to the front end of the bucket 100. At its front end, bucket 100 tapers toward the ground. Because of this, edge nozzles 30 can achieve a wider spray pattern when mixture disperser 10 is in the forward position. This also moves mixture disperser 10 further up toward the mine face. In some situations, mixture disperser 10 may disperse material as it is moved within bucket 100 rather than being operated from a fixed position at the front of bucket 100. Embodiments of mixture disperser 10 allow a scoop operator to both move mined material and apply fire control mixtures from the operator station in the scoop.

Figure 12:
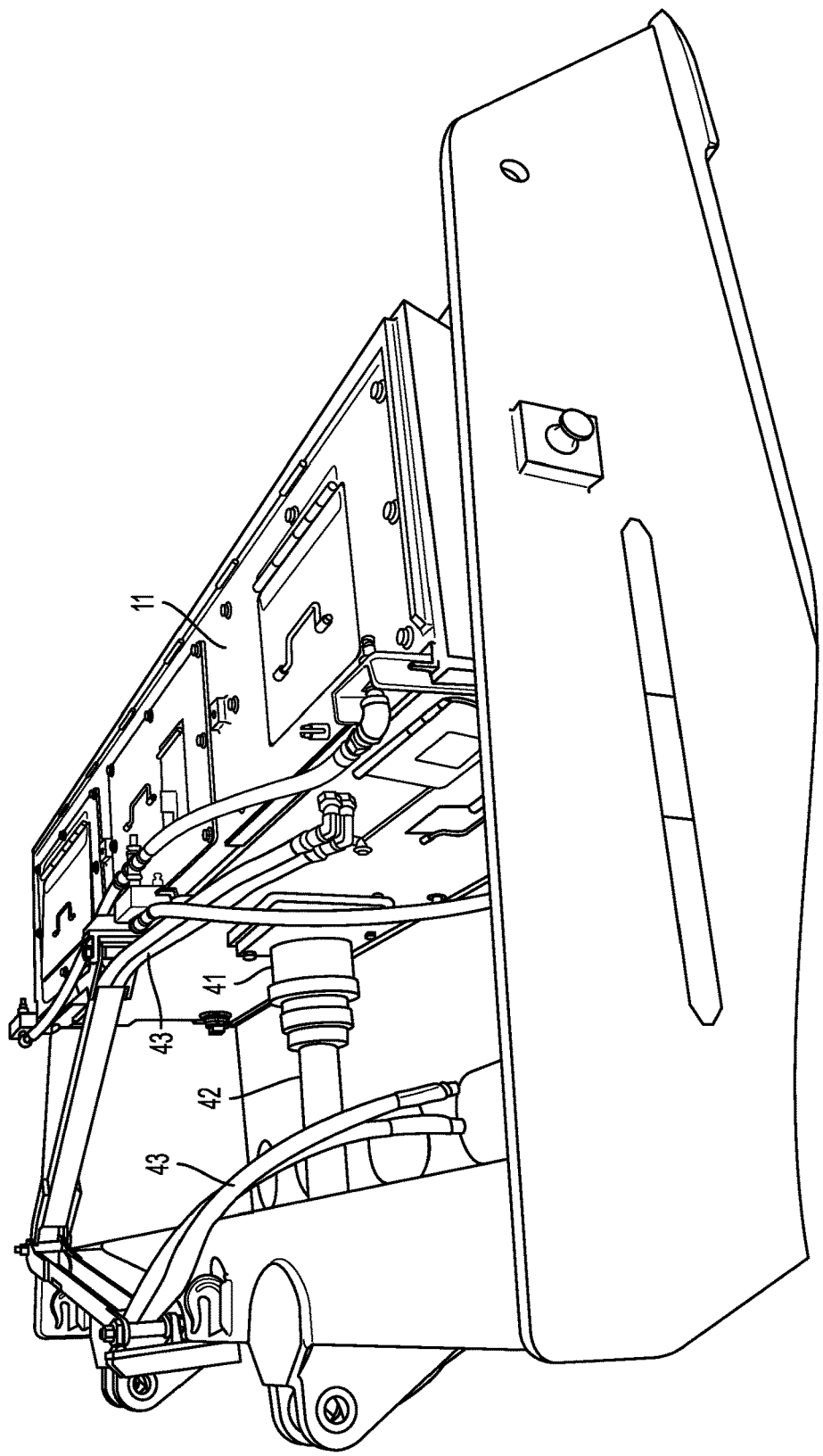
FIG. 12 is a side perspective view of the embodiment of the mixture disperser of FIGS. 1 and 2.

FIG. 12 is a side perspective view of the embodiment of the mixture disperser of FIGS. 1 and 2. In FIG. 12, hydraulic cylinder 41 and rod 42 may be seen extending from the back of housing 11. Hydraulic hoses 43 are supported by control support arm 20. At one end, hydraulic hoses 43 connect into the back of housing 11. From there hydraulic fluid is carried to cylinder 41 within housing 11. The other end of hydraulic hoses 43 is not connected and is shown in FIG. 12 laying in scoop bucket 100. In use, scoop bucket 100 would be attached to a vehicle, and the loose ends of hydraulic hose 43 would be attached to the hydraulic system of that vehicle.

It is to be understood that the embodiments and claims are not limited in application to the details of construction and arrangement of the components set forth in the description and illustrated in the drawings. Rather, the description and the drawings provide examples of the embodiments envisioned, but the claims are not limited to any particular embodiment or a preferred embodiment disclosed and/or identified in the specification. The drawing figures are for illustrative purposes only, and merely provide practical examples of the invention disclosed herein. Therefore, the drawing figures should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations. Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

I claim:

1. An apparatus for dispersing a liquid mixture for dust control in a mine in combination with a material scoop, wherein:
    said material scoop comprises a hydraulically actuated scraper blade for ejecting material from said scoop, said scraper blade having a front and a back;
    said apparatus comprising:
    a housing mounted onto said back of said scraper blade;
    a reservoir within said housing for holding the liquid mixture;
    a nozzle mounted externally on said housing;
    a hose for conducting the liquid mixture from said reservoir to said nozzle;
    a pump connected to said hose to pump the liquid mixture from said reservoir through said hose to said nozzle.

2. The apparatus of claim 1, said apparatus further comprising:
    a mixer located within said reservoir, said mixer churning the liquid mixture to prevent separation of the liquid mixture.

3. The apparatus of claim 1, said apparatus further comprising:
    a plurality of nozzles mounted to said housing and connected to a plurality of hoses which are connected to said pump.

* * * * *